(12) United States Patent
Sim et al.

(10) Patent No.: US 11,586,249 B2
(45) Date of Patent: Feb. 21, 2023

(54) ELECTRONIC DEVICE AND METHOD FOR CONTROLLING SELECTIVE DISPLAY OF GRAPHIC OBJECTS

(71) Applicant: Samsung Electronics Co., Ltd., Gyeonggi-do (KR)

(72) Inventors: Hyejin Sim, Gyeonggi-do (KR); Hyunkyoung Kim, Gyeonggi-do (KR); Hyundo Lee, Gyeonggi-do (KR); Joonhwan Kim, Gyeonggi-do (KR); Minwook Na, Gyeonggi-do (KR); Jiwon Yoo, Gyeonggi-do (KR); Boeun Song, Gyeonggi-do (KR); Yunsung Jung, Gyeonggi-do (KR); Hyemi Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/958,243

(22) PCT Filed: Jan. 24, 2019

(86) PCT No.: PCT/KR2019/000999
§ 371 (c)(1),
(2) Date: Jun. 26, 2020

(87) PCT Pub. No.: WO2019/147031
PCT Pub. Date: Aug. 1, 2019

(65) Prior Publication Data
US 2020/0401190 A1 Dec. 24, 2020

(30) Foreign Application Priority Data
Jan. 26, 2018 (KR) .......... 10-2018-0009850

(51) Int. Cl.
*G06F 3/0483* (2013.01)
*G06F 3/0484* (2022.01)
(Continued)

(52) U.S. Cl.
CPC .......... *G06F 1/1652* (2013.01); *G06F 1/1616* (2013.01); *G06F 3/0481* (2013.01);
(Continued)

(58) Field of Classification Search
CPC .. G06F 3/04817; G06F 3/0481; G06F 3/0484; G06F 3/04886
See application file for complete search history.

(56) References Cited

U.S. PATENT DOCUMENTS

2006/0284852 A1\* 12/2006 Hofmeister ........... G06F 3/0483
345/173
2010/0064244 A1\* 3/2010 Kilpatrick, II ........ G06F 1/1649
715/773
(Continued)

FOREIGN PATENT DOCUMENTS

CN 103034390 A 4/2013
CN 104484097 A 4/2015
(Continued)

OTHER PUBLICATIONS

Examination Report dated Sep. 20, 2022.

*Primary Examiner* — Nicholas Klicos
(74) *Attorney, Agent, or Firm* — Cha & Reiter, LLC

(57) ABSTRACT

According to various embodiments, an electronic device includes: a flexible display; a processor electrically connected to the flexible display; and a memory electrically connected to the processor, wherein the memory may store instructions configured to, when executed, cause the processor to display a first portion of a main page including a first object group in a folded state of the flexible display, and when the flexible display is spread, to display a second portion of the main page including a second object group in which at least one object is hidden, along with the first portion of the main page, and in response to a user input for unhiding of the second object group in which at least one object is hidden, to display the second object group in a second portion of the main page. Other embodiments are possible.

18 Claims, 16 Drawing Sheets

(51) Int. Cl.
  *G06F 3/04817* (2022.01)
  *G06F 1/16* (2006.01)
  *G06F 3/0482* (2013.01)
  *G06F 3/0481* (2022.01)

(52) U.S. Cl.
  CPC .......... *G06F 3/0482* (2013.01); *G06F 3/0483* (2013.01); *G06F 3/0484* (2013.01); *G06F 3/04817* (2013.01)

(56) References Cited

U.S. PATENT DOCUMENTS

| | | | |
|---|---|---|---|
| 2011/0061012 A1* | 3/2011 | Lim | G06F 3/04817 715/769 |
| 2012/0005602 A1* | 1/2012 | Anttila | G06F 3/0481 715/761 |
| 2012/0054684 A1* | 3/2012 | Gossweiler, III | H04N 21/482 715/828 |
| 2012/0084686 A1* | 4/2012 | Sirpal | G06F 1/16 715/767 |
| 2013/0265267 A1* | 10/2013 | Victor | G06F 3/041 345/173 |
| 2013/0321264 A1 | 12/2013 | Park et al. | |
| 2015/0169071 A1* | 6/2015 | Jitkoff | G06F 3/0485 715/863 |
| 2015/0338888 A1 | 11/2015 | Kim et al. | |
| 2016/0026219 A1 | 1/2016 | Kim et al. | |
| 2016/0041702 A1* | 2/2016 | Wang | G06F 3/0482 715/830 |
| 2016/0054862 A1* | 2/2016 | Reeves | G09G 5/14 715/767 |
| 2016/0321444 A1 | 11/2016 | Kim et al. | |
| 2019/0317658 A1* | 10/2019 | Zhang | G06F 1/3218 |

FOREIGN PATENT DOCUMENTS

| | | |
|---|---|---|
| CN | 104615352 A | 5/2015 |
| KR | 10-2012-0019064 A | 3/2012 |
| KR | 10-2015-0033303 A | 4/2015 |
| KR | 10-2015-0099255 A | 8/2015 |
| KR | 10-2015-0135060 A | 12/2015 |
| KR | 10-2016-0013748 A | 2/2016 |
| KR | 10-2016-0128606 A | 11/2016 |
| KR | 10-2017-0082036 A | 7/2017 |

* cited by examiner

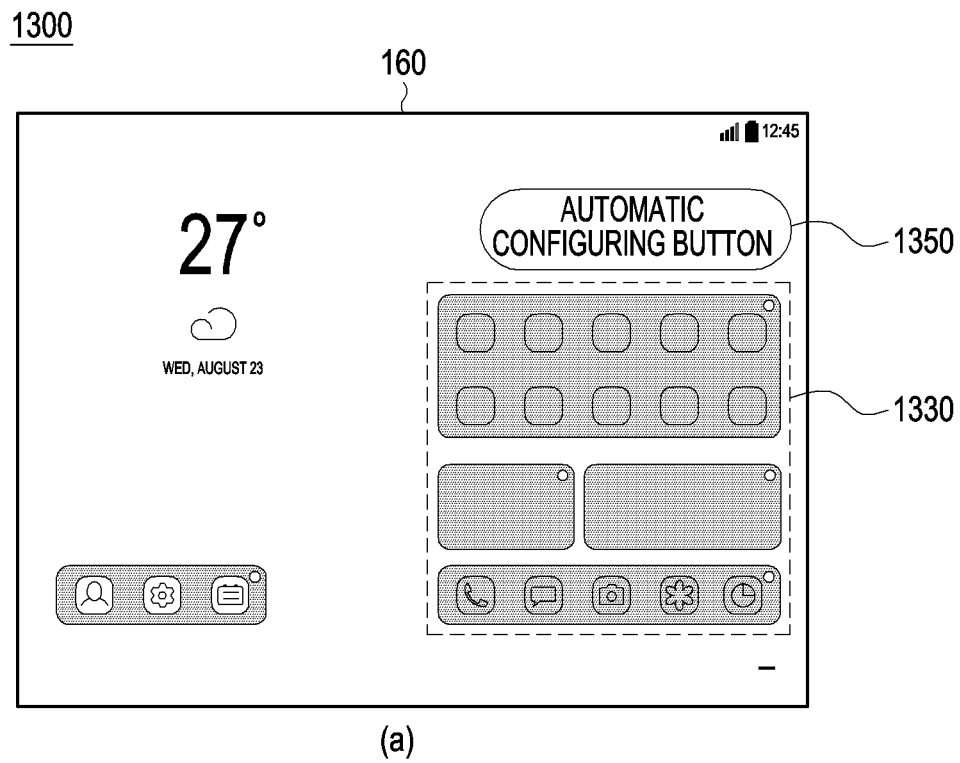
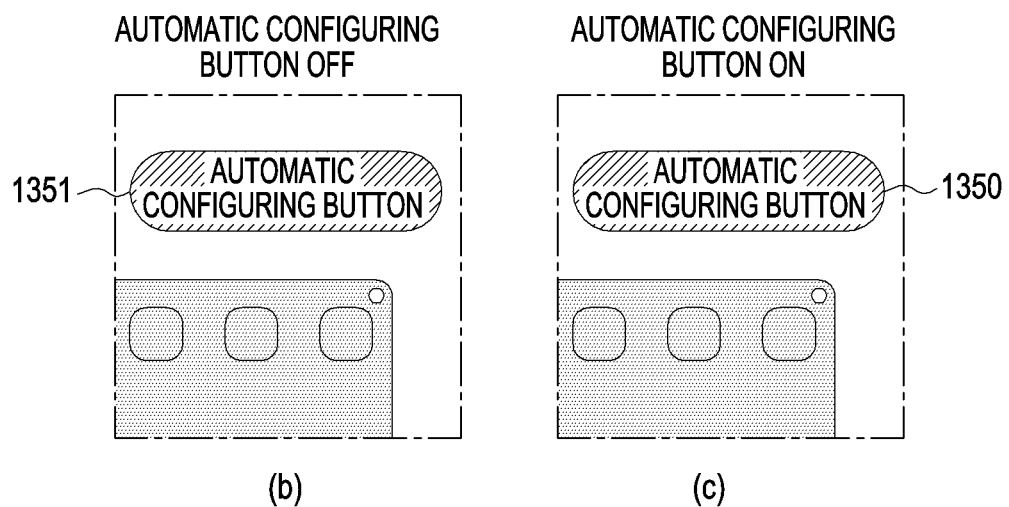
FIG.13

ELECTRONIC DEVICE AND METHOD FOR CONTROLLING SELECTIVE DISPLAY OF GRAPHIC OBJECTS

CROSS-REFERENCE TO RELATED APPLICATION(S)

This application is a National Phase Entry of PCT International Application No. PCT/KR2019/000999, which was filed on Jan. 24, 2019 and claims priority to Korean Patent Application No. 10-2018-0009850, which was filed on Jan. 26, 2018, the contents of which are incorporated herein by reference.

BACKGROUND

1. Field

Various embodiments of the disclosure relate to an electronic device and a method for controlling a display.

2. Description of the Related Art

Various services and additional functions provided by electronic devices have been gradually expanded. In order to increase the utility value of the electronic devices and satisfy various needs of users, electronic device manufacturers or communication service providers have competitively developed electronic devices to provide more various functions and to differentiate them from other companies.

In addition to these various services, electronic devices are also used as a means of displaying personality. For example, the electronic device not only provides services and functions, but also performs a function of expressing an individual. In providing such various features, a display device has become one of essential devices, and its performance and form are also gradually diversifying.

In recent years, in order to meet the needs of users who want newer and more diverse functions, flexible electronic devices that can be deformed like paper have been developed. The shape of a flexible electronic device may be deformed by a user applying a force thereto, or may be provided in a folding form.

SUMMARY

The flexible electronic device can implement a wider screen by using a feature wherein the display can be folded and unfolded, and more icons or widgets can be placed on the wider screen without adding pages.

However, if a large number of icons or widgets are placed on the screen, the user may feel visually uncomfortable, and might not meet the expression of personality and visual desire through the background screen.

According to various embodiment, there may be provided an electronic device and a method that control a display to display at least a portion of a main page on a flexible display or selectively display at least one object included in the main page, based on the state of the electronic device or the user's intention.

According to various embodiments, an electronic device may include a flexible display, a processor electrically connected to the flexible display, and a memory electrically connected to the processor, wherein the memory stores instructions configured to, when executed, cause the processor to: display a first portion of a main page including a first object group in a folded state of the flexible display; display a second portion of the main page including a second object group in which at least one object is hidden, along with the first portion of the main page when the flexible display is spread; and display the second object group in a second portion of the main page in response to a user input to unhide the second object group in which the at least one object is hidden.

According to various embodiments, a method for controlling a display may include an operation of displaying a first portion of a main page including a first object group in a folded state of the flexible display; an operation of displaying a second portion of the main page including a second object group in which at least one object is hidden, along with the first portion of the main page when the flexible display is spread; and an operation of displaying the second object group in the second portion of the main page, in response to a user input to unhide the second object group in which the at least one object is hidden.

According to various embodiments, in a non-transitory storage medium storing instructions, the instructions configured to cause at least one circuit to perform at least one operation when executed by the at least one circuit, wherein the at least one operation may include: an operation of displaying a first portion of a main page including a first object group in a state where the flexible display is folded; an operation of displaying a second portion of the main page including a second object group in which at least one object is hidden, along with the first portion of the main page, when the flexible display 160 is spread; and an operation of displaying the second object group in the second portion of the main page in response to a user input for releasing the hiding of the second object group in which the at least one object is hidden.

In various embodiments, a wider screen can be realized by using a feature in which the display of a flexible electronic device can be folded and unfolded, more icons or widgets can be placed on a wider screen without adding pages, and the display is controlled such that at least a portion of the main page is displayed on the flexible display or at least one object included in the main page is selectively displayed based on the state of the electronic device or the user's intention, so that the user can improve usability without visual discomfort, and a user's personality can be expressed and visual needs satisfied through the background screen.

BRIEF DESCRIPTION OF THE DRAWINGS

FIGS. 13A, 13B, and 13C are exemplary views illustrating a display method of an electronic device according to various embodiments;

DETAILED DESCRIPTION

Figure 1:
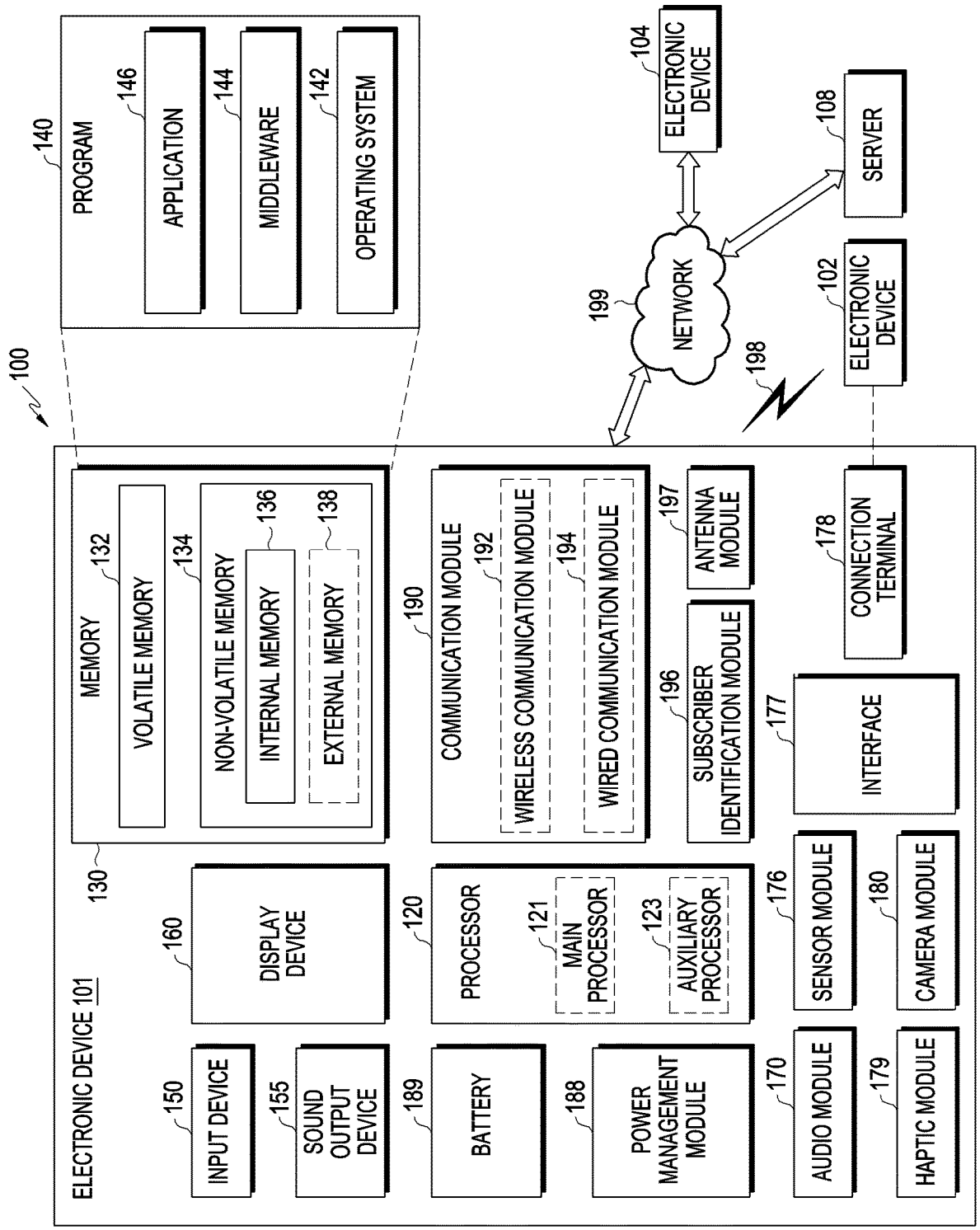
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be integrated and implemented as in, for example, the sensor module 176 (e.g., a fingerprint sensor, an iris sensor, or an illuminance sensor) embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load and process a command or data received from another component (e.g., the sensor module 176 or the communication module 190) in volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. Here, the auxiliary processor 123 may be operated separately from or embedded in the main processor 121.

In such a case, the auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the non-volatile memory 134.

The program 140 is software stored in the memory 130, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101, and may include, for example, a microphone, a mouse, or a keyboard.

The sound output device 155 is a device configured to output sound signals to the outside of the electronic device 101, and may include, for example, a speaker or a receiver. The speaker may be used for general purposes, such as playing multimedia or playing record, and the receiver may be used only for incoming calls. According to an embodiment, the receiver may be implemented as separate from, or as part of the speaker.

The display device 160 is a device configured to visually provide information to a user of the electronic device 101, and may include, for example, a display, a hologram device, or a projector and control circuitry to control a corresponding one of the display, hologram device, and projector. According to an embodiment, the display device 160 may include touch circuitry or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101, and may be implemented as at least part of, for example, a power management integrated circuit (PMIC).

The battery 189 is a device configured to supply power to at least one component of the electronic device 101, and may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip or may be implemented as separate chips, respectively.

According to an embodiment, the wireless communication module 192 may identify and authenticate the electronic device 101 in a communication network, using user information stored in the subscriber identification module 196.

The antenna module 197 may include at least one antenna module for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the function requested or an additional function, and transfer an outcome of the performing to the electronic device 101. The electronic device 101 may provide the function or service requested, with or without further processing of the outcome. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular expression may include a plural expression, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Such terms as "1st" and "2nd," or "first" and "second" may represent corresponding components regardless of order or importance, may be used to simply distinguish one component from another, and do not limit the corresponding components. When it is described that an element (e.g., a first element) is "(operatively or communicatively coupled with/to" or "connected" to another element (e.g., a second element), the element can be directly connected to the other element or can be connected to the other element through another element (e.g., a third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g a computer). The machine is a device capable of invoking the stored instruction and operating according to the invoked instruction, and may include the electronic device (e.g., the electronic device 101) according to the embodiments set forth herein. When the instruction is executed by the processor (e.g., the processor 120), the processor may perform functions corresponding to the instruction directly, or functions corresponding to the instruction can be performed using other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each component (e.g., a module or a program) according to various embodiments may include a single entity or multiple entities. Some of the above-described sub-components may be omitted, or one or more other components may be added to various embodiments. Alternatively or additionally, some components (e.g., modules or programs) may be integrated into a single entity, and the single entity may still perform one or more functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various embodiments (e.g., an electronic device 101 of FIG. 1 or a flexible electronic device 101 of FIGS. 2 to 4) may include a flexible display (e.g., a display device 160 of FIG. 1 or a flexible display 160 of FIGS. 2 to 3), a processor (e.g., a processor 120 of FIG. 1) electrically connected to the flexible display 160, and a memory (e.g., a memory 130 of FIG. 1) electrically connected to the processor 120. The memory 130 may store instructions to cause the processor 120, when executed, to display a first portion of a main page including the first object group in the state where the flexible display 160 is folded, display a second portion of the main page including a second object group in which at least one object is hidden, along with the first portion of the main page, when the flexible display 160 is spread, and display the second object group in a second portion of the main page in response to a user input for releasing the hiding of the second object group in which the at least one object is hidden.

In the electronic device 101 according to various embodiments, each of the first and second object groups may include at least one object, and the at least one object may include at least one of an icon or a widget.

In the electronic device 101 according to various embodiments, the main page may include a first layer on which a background screen is disposed, a second layer on which the first object group of the first portion is disposed on the first layer, and a third layer on which the second object group of the second portion is disposed on the first layer.

In the electronic device 101 according to various embodiments, in the main page, the first portion and the second portion may be configured as one page, based on a surface on which the flexible display 160 is spread.

In the electronic device 101 according to various embodiments, the instructions may cause the processor 120 to provide an interface for hiding or unhiding the at least one object in the second object group, or adding a new object in the second object group with the second object group displayed on the second portion of the main page.

In the electronic device 101 according to various embodiments, the instructions may configure the processor 120 to receive a user input for selecting or deselecting at least one object in the second object group included in the second portion of the main page using the interface, and based on the user input, to hide or unhide the selected or unselected object from the second object group.

In the electronic device 101 according to various embodiments, the instructions may configure the processor 120 to group adjacent objects in the second object group included in the second portion of the main page into at least one sub-object group and, using the interface, receive a user input for selecting or deselecting at least one object in the second object group included in the second portion of the main page using the interface, and based on the user input, to hide or unhide the sub-object from the second object group.

In the electronic device 101 according to various embodiments, the instructions may configure the processor 120 to receive a user input for individually selecting or deselecting at least one object in the at least one sub-object group using the interface, and based on the user input, to hide or unhide the selected or unselected object from the second object group.

In the electronic device 101 according to various embodiments, the instructions may configure the processor 120 to provide a configuration button for configuring to hide or unhide the at least one object in the second object group according to the attribute of the at least one object in the second object group, while the second object group is displayed on the second portion of the main page.

In the electronic device 101 according to various embodiments, the instructions may configure the processor 120 to receive a user input for selecting or deselecting the configuration button, and based on the user input, to hide or unhide the selected or unselected object from the second object group according to the attribute of the at least one object in the second object group.

In the electronic device 101 according to various embodiments, the attribute of the at least one object may include at least one of the total number of uses for an application corresponding to the at least one object, recent frequency of use for the application corresponding to the at least one object, or the state of the flexible display when the application is executed.

In the electronic device 101 according to various embodiments, the instructions may configure the processor 120 to rearrange and display the display position of the at least one object in which the hiding is released, if there is at least one unhidden object in the second object group in which the at least one object included in the second portion of the main page is hidden.

In the electronic device 101 according to various embodiments, the instructions may configure the processor 120 to rearrange and display the display position of at least one unhidden object in a group region to which the at least one unhidden object belongs if there is at least one unhidden object in the second object group in which the at least one object included in the second portion of the main page is hidden.

In the electronic device 101 according to various embodiments, the instructions may configure the processor 120 to display a third object group on a second portion of the main page including at least one object associated with the first application and corresponding to at least one second application different from the first application if the execution screen of the first application is displayed on the first portion of the main page while the flexible display 160 is spread.

Figure 2:
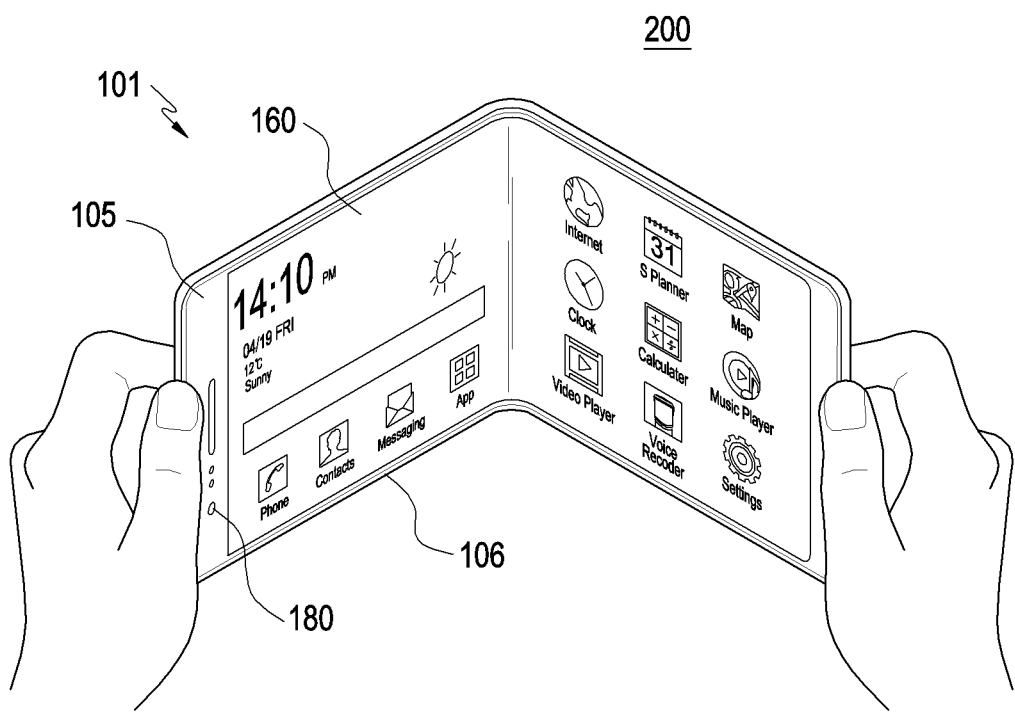
FIG. 2 is a view illustrating an electronic device according to various embodiments.

FIG. 2 is a view 200 illustrating an electronic device according to various embodiments.

Referring to FIG. 2, the electronic device 101 (e.g., the electronic device 101 of FIG. 1) according to various embodiments may include a display 160 (e.g., the display device 160 of FIG. 1) disposed on the front surface 105. The display 160 may be a flexible display having foldable or spreadable characteristics. The display 160 may be largely disposed to occupy most of the front surface 105 of the electronic device 101. For example, a main page (e.g., a main home screen) may be displayed on the display 160. The main page may be a first page screen or a graphical user interface (GUI) capable of user interaction displayed on the display 160 when the electronic device 101 is turned on. On the main page, at least one of shortcut icons for executing frequently used applications, a main menu switching key, time, and weather may be displayed. When the user selects the main menu switch key, a menu screen may be displayed on the display 160.

A status bar indicating at least one state of the electronic device 101 such as a battery charging state, an intensity of a received signal, or a current time may be displayed on the top of the display 160. A home button (not shown), a menu button (not shown), and/or a back button (not shown) may be disposed on one side (or bezel or may be referred to as a case portion around the display 160) of the edge of the front surface 105 of the electronic device 101.

The home button can be used to display a main page (e.g., the main home screen) on the display 160. In addition, the home button may be used to display recently used applications on the display 160 or to display a task manager. The menu button may be used to provide a connection menu that can be displayed on the display 160. The connection menu may include at least one of a widget addition menu, a background change menu, a search menu, an edit menu, and an environment configuring menu. The back button may be used to display a screen that was executed immediately before the currently running screen, or to close the most recently used application.

A camera 180 and/or at least one sensor such as a distance sensor, an illuminance sensor, and a proximity sensor may be disposed on the other side of the edge of the front surface 105 of the electronic device 101.

At least one of a volume button (not shown) having, for example, a power/lock button (not shown), a volume increase button, and a volume decrease button may be disposed on the side 106 of the electronic device 101.

The electronic device 101 may detect an input for changing the form of the display 160. The electronic device 101 may detect an input by folding operation for folding the display 160 or a spread operation for spreading the display 160, and may control a display operation of the display 160 in response to the detected input.

Folding of the display 160 may mean an operation of folding the display 160 so that the first portion and the second portion of the display 160 face the opposite directions by folding the display 160 in half with respect to the central axis while the display 160 is parallel. Also, the folding may mean an operation in which the first portion and the second portion of the display 160 overlap each other. For example, when the first portion and the second portion of the display 160 are folded to face the opposite directions by folding the display 160, the first portion and the second portion of the display 160 may maintain the activated states, and a screen composed of one page may be displayed in the folded form on the first and second portions of the display 160, or a screen composed of different pages may be displayed. Alternatively, one of the first portion or the second portion of the display 160 may remain activated, and the other portion may be deactivated, and portion of the screen composed of one page of the first portion and the second portion may be displayed on the activated portion of the first portion and the second portion of the display 160 or the screen of the page reconfigured to the size of the activated portion of the first portion or the second portion may be displayed. In addition, when the first portion and the second portion of the display 160 are folded so that they overlap each other by folding the display 160, both the first portion and the second portion of the display 160 may be deactivated.

The spread of the display 160 may mean an operation in which the first portion and the second portion are spaced apart from each other and move in parallel while the display 160 is folded into the first portion and the second portion. For example, the first portion and the second portion of the display 160 are parallel with a spread, and a screen composed of one page may be displayed on the first portion and the second portion of the display 160, or a screen composed of different pages may be displayed.

Figure 3:
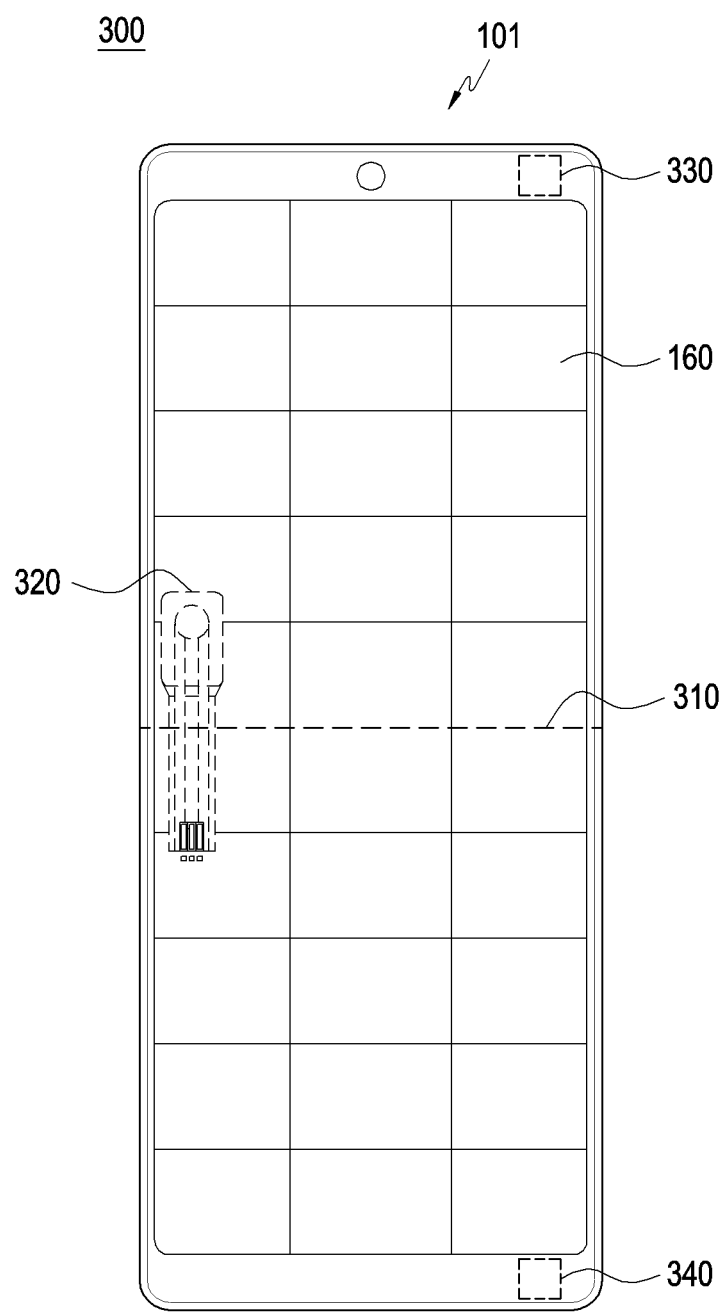
FIG. 3 is a view illustrating a front surface of an electronic device according to various embodiments.
Figure 4:
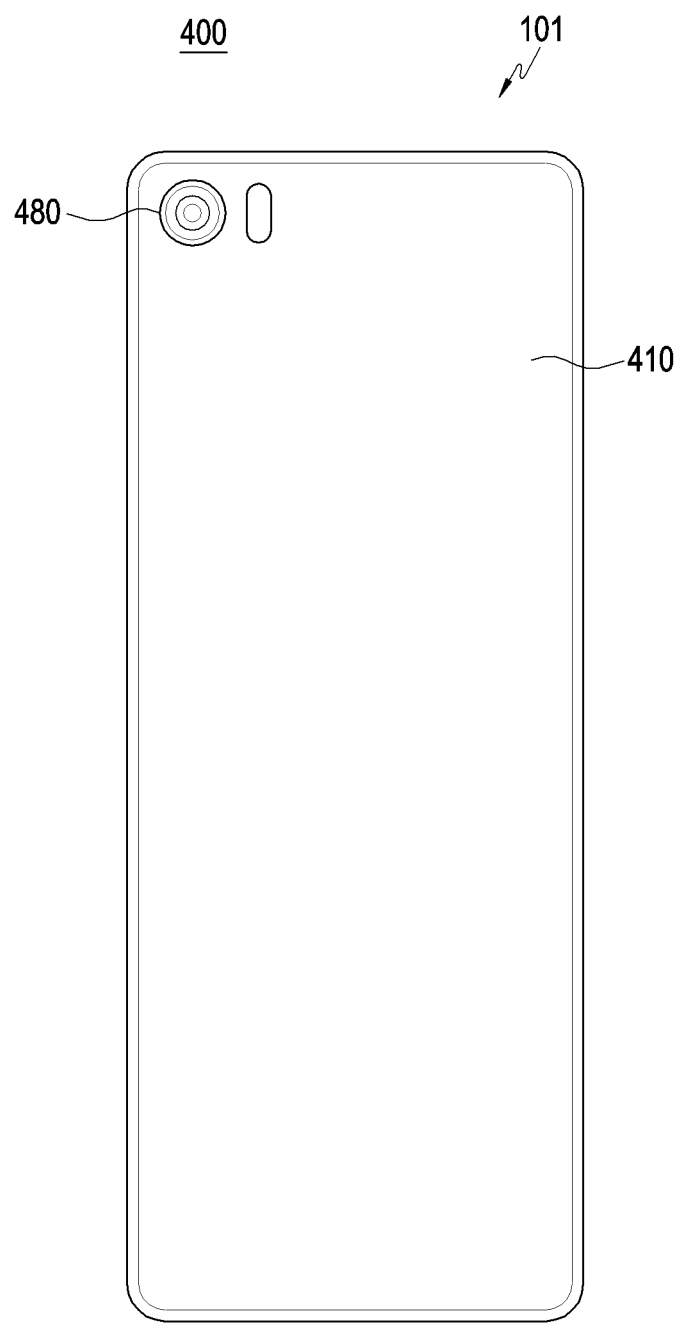
FIG. 4 is a view illustrating a rear surface of an electronic device according to various embodiments.

FIG. 3 is a view 300 illustrating a front surface of an electronic device according to various embodiments, and FIG. 4 is a view 400 illustrating a rear surface of an electronic device according to various embodiments.

Referring to FIGS. 3 and 4, the electronic device 101 (e.g., the electronic device 101 of FIG. 1) according to various embodiments may include a strain sensor 320 (e.g., a strain gauge), a first sensor 330, and a second sensor 340 and may include a display 160 (e.g., the display device 160 of FIG. 1) on the front surface of the electronic device 101. Further, at least one sensor such as a rear camera 480, a flash, a speaker, a distance sensor, or the like may be disposed on the rear surface 410 of the electronic device 101.

The display 160 of the electronic device 101 may be a flexible display having foldable or spreadable characteristics, and may further include a circuit board (not shown) to control the display operation of the display 160 in response to the input by the folding or spread operation. The display operation of the display 160 that can be performed by the circuit board may be performed by the processor (the processor 120 of FIG. 1).

As shown in FIG. 3, in the unfolded electronic device 101, the display 160 may be disposed on the front surface of the electronic device 101, but as illustrated in FIG. 4, the display might not be formed on the rear surface 410 of the electronic device 101. The display 160 may be folded based on the central axis 310 of the display 160, and the central axis 310 may be a virtual reference axis that folds and unfolds the display 160 to the outside, and the position thereof may correspond to the center or a portion of the display 160. The display 160 is not limited to being folded outward, and may be implemented to be folded inward so that both ends of the display 160 face each other. When the display 160 is folded based on the central axis 310, the display 160 exposed to the outside may be divided into a first portion and a second portion.

The strain sensor 320 may be disposed on the central axis 310 of the electronic device 101. For example, the central axis 310 may be a position where the flexible display is folded. The strain sensor 320 may be disposed at a position where the flexible display is folded, and may output a strain value used to measure the folded angle of the electronic device 101.

The first sensor 330 may be disposed at one edge of the front surface of the display 160, and the second sensor 340 may be disposed at the other edge of the front surface of the display 160. The first and second sensors 330 and 340 may detect a change in the folded state of the electronic device 101. For example, the first and second sensors 330 and 340 may include at least one of a distance sensor and a gyroscope sensor, respectively. Alternatively, the first sensor 330 may be a magnetic force sensing sensor, and the second sensor 340 may be a magnetic force applying unit. For example, in response to the operation of folding the electronic device 101, the distance between the first sensor 330, which is a magnetic force sensing sensor, and the second sensor 340, which is a magnetic force applying unit, becomes closer, and accordingly, the magnetic force sensing sensor can detect the magnetic force intensity caused by the magnetic force. In this way, as the distance between the magnetic force sensing sensor and the magnetic force applying unit becomes closer, the magnetic strength varies, so the electronic device 101 can calculate a folding angle or the like, based on the magnetic strength.

The display 160 may include a flexible panel for displaying an image, and may detect at least one of pressure, fingerprint, or the like, or may include a sensor for detecting pressure and fingerprint.

Figure 5:
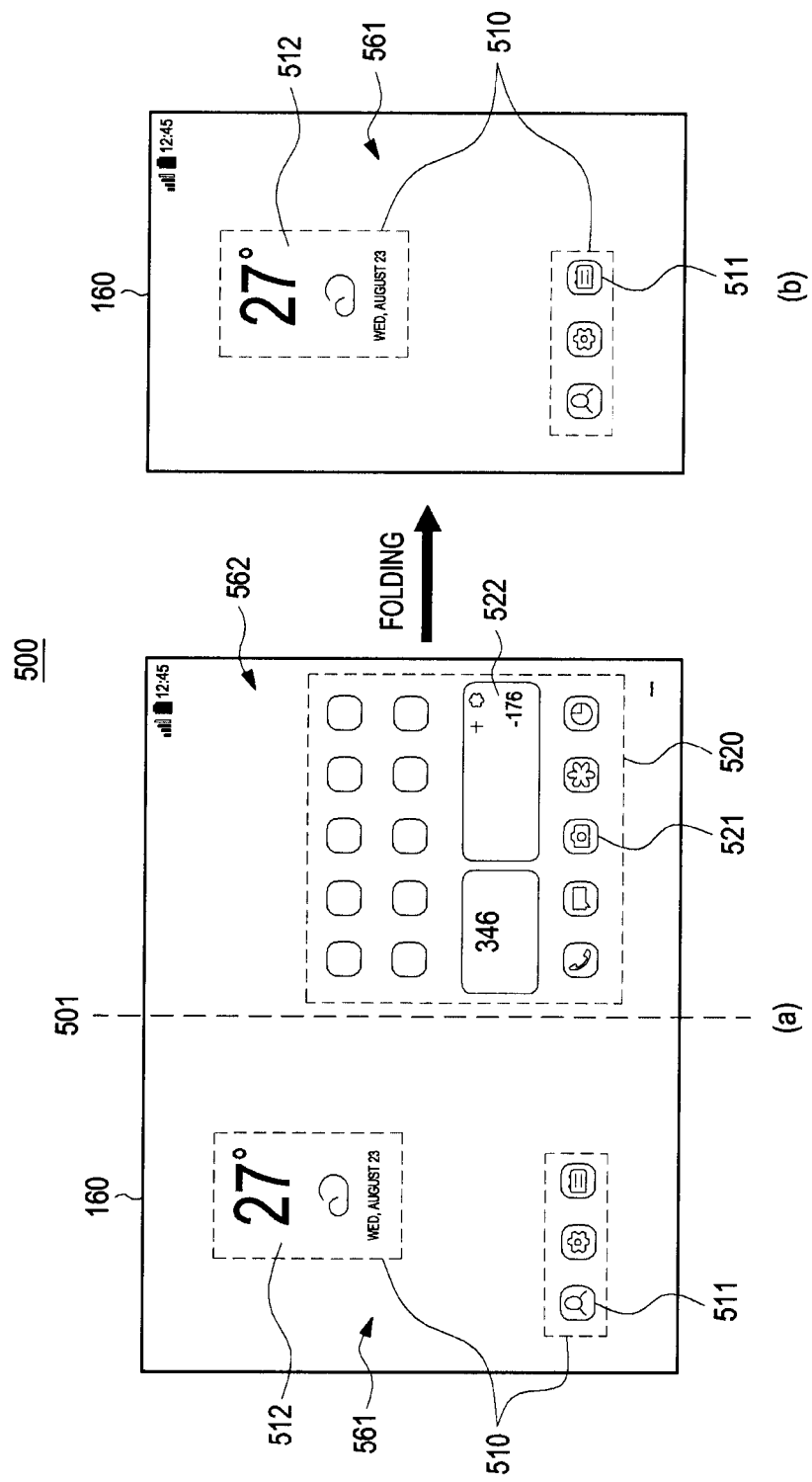
FIGS. 5A and 5B are conceptual views illustrating a display screen of an electronic device according to various embodiments.

FIGS. 5A and 5B are conceptual views 500 illustrating a display screen of an electronic device according to various embodiments.

Referring to FIGS. 5A and 5B, a display 160 (e.g., the display device 160 of FIG. 1 or the display 160 of FIGS. 2 to 3) of the electronic device 101 (e.g., the electronic device 101 of FIGS. 1 to 4) according to various embodiments may be a flexible display having foldable or spreadable characteristics. The electronic device 101 may display a screen displayed on the display 160 as a screen changed according to a state of the display 160 (e.g., a folding state or a spread state) using the characteristics of the flexible display. The above illustrates an example in which the screen is changed as the flexible display is folded or spread, but is not limited thereto. The dual display in which a plurality of displays is combined through a hinge may be implemented to change the screen as it is folded or spread. Alternately, the screen may be changed as the screen on one display is divided or integrated into a plurality of areas.

Referring to FIG. 5A, when the display 160 is in a spread state in which the display 160 is unfolded, the electronic device 101 may display a main page (e.g., a main home screen) in which a first portion 561 and a second portion 562 are composed of one page, based on the central axis 501 of the display 160, on the display 160.

The main page may include a first layer in which a background screen composed of one page of the first portion 561 and the second portion 562 is disposed, a second layer on which the first object group 510 displayed in the first portion 561 is disposed on the first layer, and a third layer on which the second object group 520 displayed in the second portion 562 is disposed on the first layer. The second layer and the third layer may be the same layer.

The first object group 510 may be displayed on the first portion 561 of the main page. The first object group 510 may include a first icon 511 or a first widget 512. For example, the first icon 511 may be shortcut icons for executing applications most frequently used by a user. Also, the first widget 512 may be a widget that is desired to be displayed at all times, such as time or weather.

The second object group 520 may be displayed on the second portion 562 of the main page. The second object group 520 may include a second icon 521 or a second widget 522. For example, the second icon 521 may be shortcut icons for executing applications mainly used by a user. Also, the second widget 522 may be a widget mainly used by a user.

Referring to FIG. 5B, when the display 160 is in the folded state, the electronic device 101 may display a portion of the main page in which the first portion 561 is composed of one page on the display 160, or may display a main page reconfigured to the size of the first portion 561.

The first object group 510 may be displayed on the first portion 561 of the main page while the display 160 is folded. The first object group 510 may include a first icon 511 or a first widget 512. For example, the first object group 510 displayed on the first portion 561 of the main page may maintain the shape of the first object group 510 illustrated in FIG. 5A.

Figure 6:
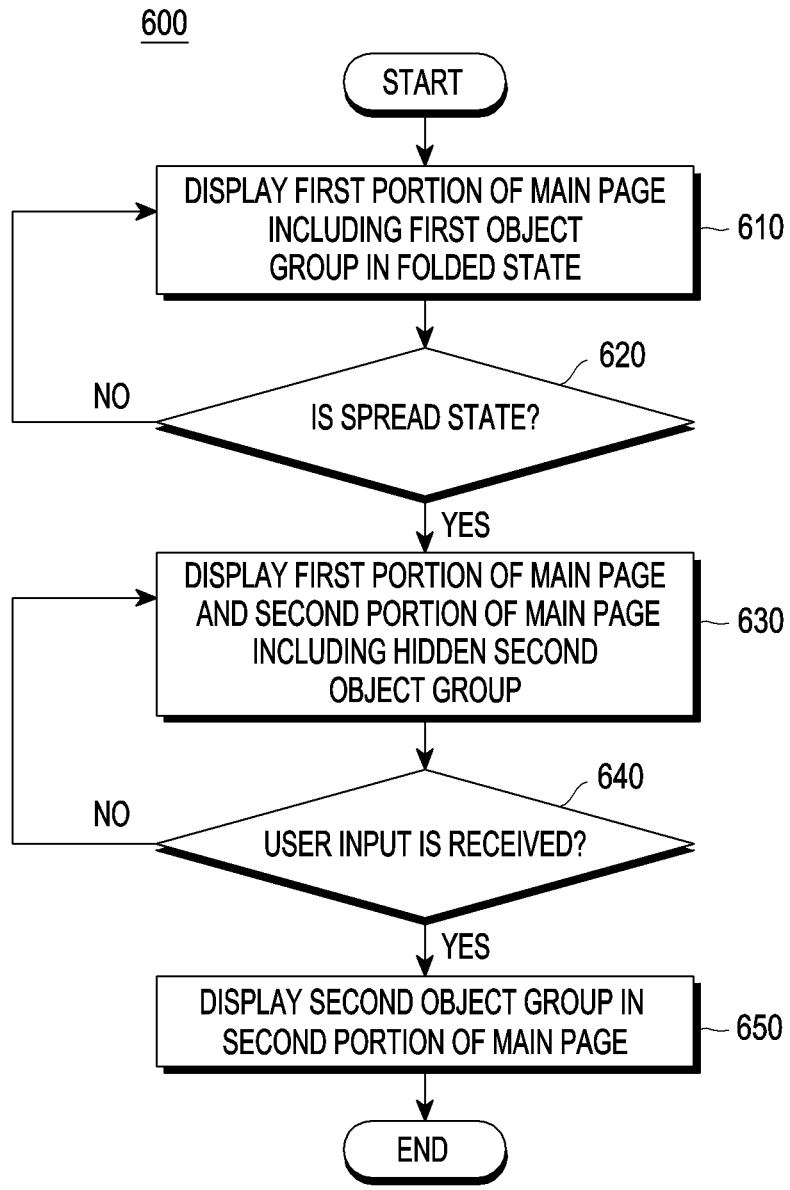
FIG. 6 is a flowchart illustrating a method of controlling a display of an electronic device according to various embodiments.
Figure 7:
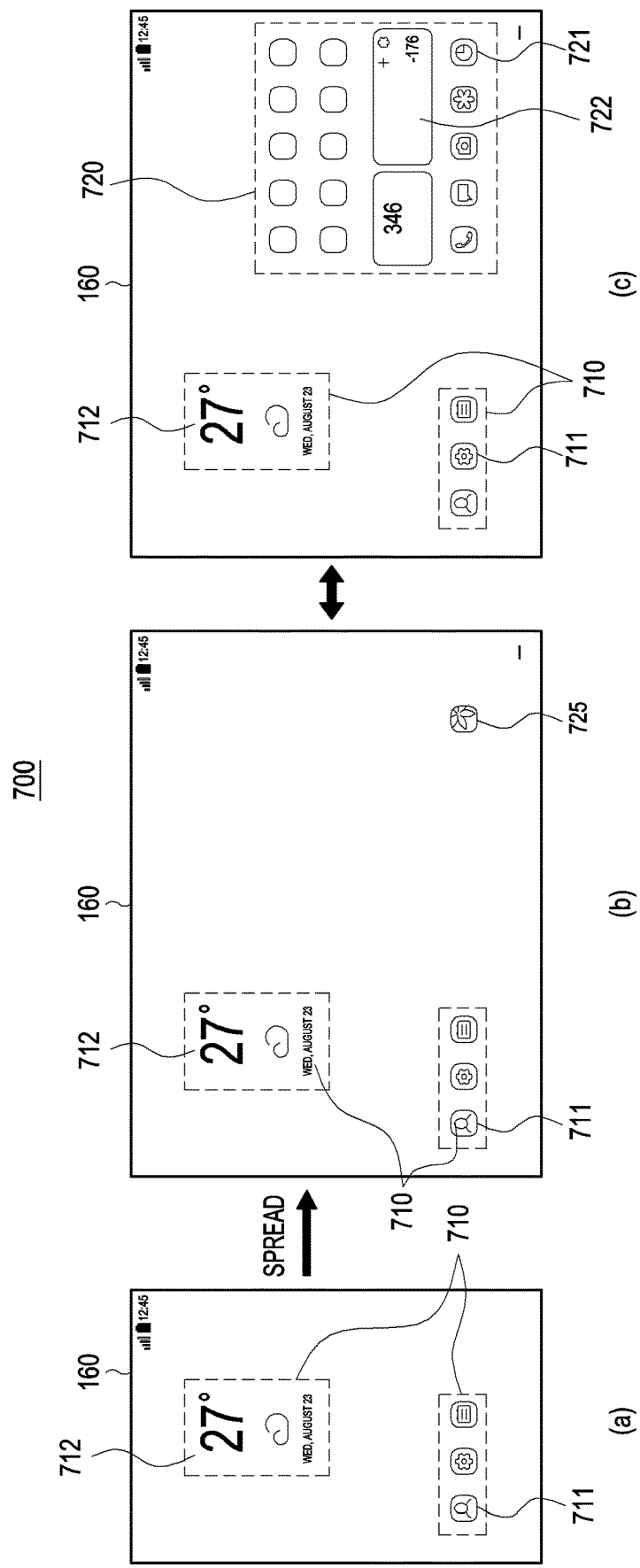
FIGS. 7A, 7B, and 7C are exemplary views illustrating a display method of an electronic device according to various embodiments.

FIG. 6 is a flowchart 600 illustrating a method of controlling a display of an electronic device according to various embodiments. The embodiment of FIG. 6 will be described in more detail with reference to FIGS. 7A to 7C. FIGS. 7A to 7C are exemplary views 700 illustrating a display method of an electronic device according to various embodiments.

According to various embodiments, operations 610 to 650 may be realized through the electronic device 101 or the processor 120 of FIG. 1. The electronic device 101 may store instructions for performing the operations 610 to 650 in a memory (e.g., the memory 130 of FIG. 1).

In operation 610, the electronic device 101 may display a first portion of a main page including a first object group while the display 160 is folded. The display 160 of the electronic device 101 may be a flexible display having foldable or spreadable characteristics. The electronic device 101 may control the display 160 in response to a state change (e.g., folding or spread) of the display 160. For example, as illustrated in FIG. 7A, the electronic device 101 may display a first object group 710 on the first portion of the display 160 while the display 160 is folded. The first object group 710 may include a first icon 711 or a first widget 712. For example, the first icon 711 may be shortcut icons for executing applications most frequently used by a user. Further, the first widget 712 may be a widget that is desired to be displayed at all times, such as time or weather.

In operation 620, the electronic device 101 may determine whether the display 160 is switched from the folded state to the spread state. The electronic device 101 may include a sensor capable of detecting that the display 160 is folded or spread. The electronic device 101 may detect folding or spread of the display 160 through the sensor. The electronic device 101 may determine whether the display 160 is currently spread or folded, based on the angle at which the display 160 is spread (or folded). If the angle exceeds a predetermined range, the electronic device 101 may determine whether the display 160 is currently spread or folded. For example, if the display 160 is spread from the folded state, the electronic device 101 may determine that the display 160 is currently spread if the angle of the spread state from the folded state exceeds a predetermined range. For example, when the display 160 is folded from the spread state, if the angle of the folded state from the spread state exceeds a predetermined range, the electronic device 101 may determine that the display 160 is currently folded. The predetermined range is variably adjustable.

In operation 630, when the display 160 is spread, the electronic device 101 may display the second portion of the main page including the second object group in which at least one object is hidden, along with the first portion of the main page. The electronic device 101 may control the display 160 in response to a state change (e.g., folding or spread) of the display 160. For example, as illustrated in (b) of FIG. 7, at least one object is hidden in the second object group 720 on the second portion of the display 160, which is displayed as the display 160 is switched from the folded state to the spread state, and the electronic device 101 may display only at least one object 725 that is not hidden. To this end, the electronic device 101 may hide or unhide at least one object in the second object group 720 while the second object group 720 is displayed on the second portion of the spread display 160, provide an interface for adding a new object into the second object group 720, and previously store configuration information for hiding or unhiding at least one object in the second object group from the user via the interface. For example, the electronic device 101 may determine whether at least one object in the second object group 720 to be displayed on the second portion of the display 160 spread in the folded state is configured to be hidden. If it is determined that the hiding of the second object group 720 is configured, the electronic device 101 may hide the entire second object group 720 on the second portion of the display 160 based on the configuration information, or may display only at least one object 725 that is not hidden in the object group 720.

In operation 640, the electronic device 101 may determine whether a user input for unhiding the second object group in which at least one object is hidden is received. The electronic device 101 may determine whether a user input is received by detecting a specific gesture of the user through the display 160. For example, the electronic device 101 may display a specific button to release the hiding of the second object group on the main page displayed through the display 160, and may receive a user input by detecting a user's touch gesture on the specific button. Alternatively, the electronic device 101 may receive a user input by detecting a preconfigured specific gesture (e.g., pinch in or double tap) of a user through an arbitrary area of the display 160. Alternatively, the electronic device 101 may receive a user input by detecting a user's voice or motion using at least one sensor (e.g., microphone, motion sensor, etc.) in the electronic device 101.

In operation 650, when the user input is received, the electronic device 101 may display the second object group on the second portion of the main page in response to the user input. The electronic device 101 may control the display 160 in response to a user input. For example, as illustrated in FIG. 7C, when the user input is input while at least one object is hidden in the second object group 720 on the second portion of the spread display 160 and only at least one object 725 that is not hidden is displayed, the electronic device 101 may display objects 721 and 722 included in the second object group 720.

Figure 8:
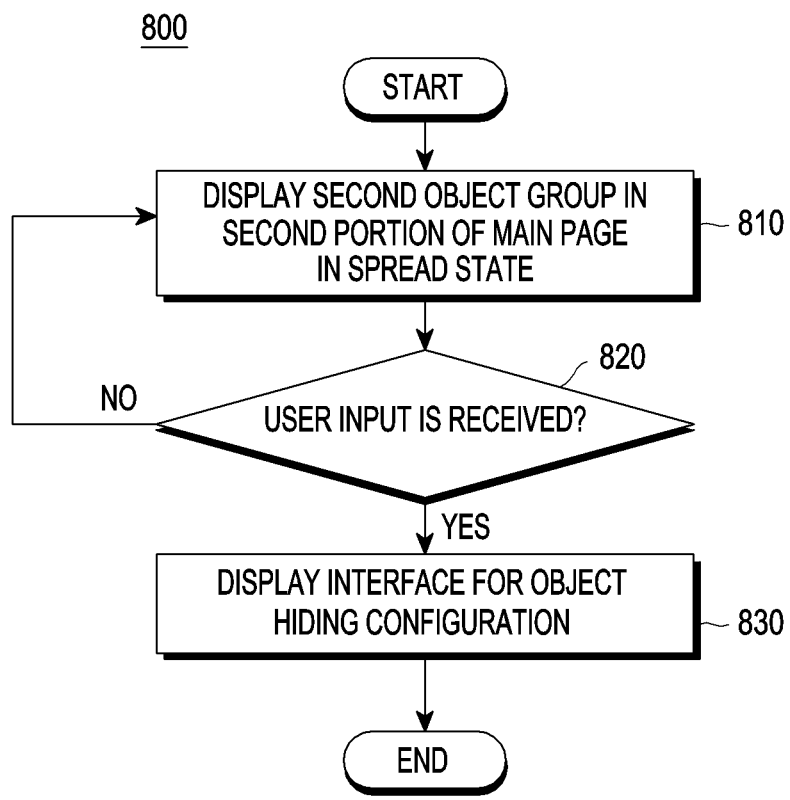
FIG. 8 is a flowchart illustrating a method of controlling a display of an electronic device according to various embodiments.

FIG. 8 is a flowchart 800 illustrating a method of controlling a display of an electronic device according to various embodiments. The embodiment of FIG. 8 will be described in more detail with reference to FIGS. 9A to 9D. FIGS. 9A to 9D are exemplary views 900 illustrating a display method of an electronic device according to various embodiments.

According to various embodiments, operations 810 to 830 may be realized through the electronic device 101 or the processor 120 of FIG. 1. The electronic device 101 may store instructions for performing operations 810 to 830 in a memory (e.g., the memory 130 of FIG. 1).

Figure 9:
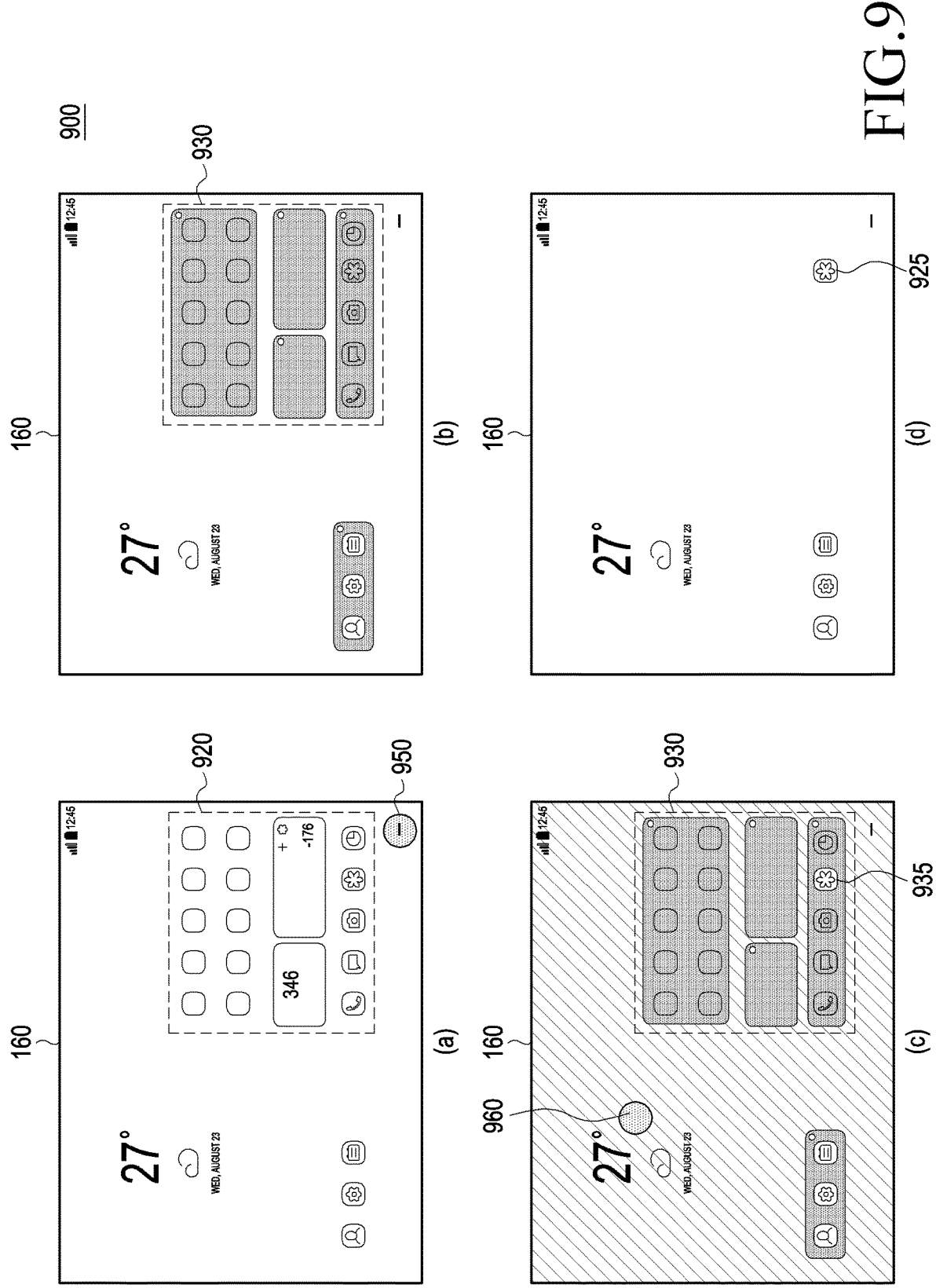
FIGS. 9A, 9B, 9C and 9D are exemplary views illustrating a display method of an electronic device according to various embodiments.

In operation 810, the electronic device 101 may display a second object group 920 on the second portion of the display 160 while the display 160 is spread, as shown in FIG. 9A. For example, if it is not configured to hide at least one object in the second object group 920 to be displayed on the second portion of the spread display 160, the electronic device 101 may display a second object group 920 in which the object is not hidden on the second portion of the display 160. Alternatively, when the hiding of the second object group is released by the user, the electronic device 101 may display the second object group 920 in which the object is not hidden on the second portion of the display 160.

In operation 820, the electronic device 101 may hide or unhide the at least one object in the second object group while the second object group 920 is displayed on the second portion of the display 160, or may determine whether a user input requesting an interface for adding a new object into the second object group is received. For example, as illustrated in FIG. 9A, the electronic device 101 may display a specific button for configuring the hiding of the second object group on the main page displayed through the display 160 and may receive a user input by detecting a user's touch gesture 950 on the specific button. Alternatively, the electronic device 101 may receive a user input by detecting a specific gesture (e.g., pinch out or long press) of a preconfigured user via an arbitrary area of the display 160. Alternatively, the electronic device 101 may receive a user input by detecting a user's voice or motion using at least one sensor (e.g., microphone, motion sensor, etc.) in the electronic device 101.

In operation 830, when the user input is received, the electronic device 101 may hide or unhide the at least one object in the second object group in response to the user input, or may provide an interface for adding a new object into the second object group. For example, as illustrated in FIG. 9B, the electronic device 101 may provide the interface 930 capable of receiving a user input for selecting (e.g., applying shading effect) or deselecting (e.g., removing shading effect) an object by a user, in which a shadow effect is applied to objects in the second object group 920 displayed in the second portion of the main page displayed through the display 160.

According to various embodiments, as illustrated in FIG. 9C, the electronic device 101 may deselect at least one object 935 in the second object group 920 via the interface 930 (e.g., removing a shadow effect), and may exclude the deselected object 935 from the hidden configuration of the second object group. The electronic device 101 may determine whether the user touch 960 is detected via an arbitrary area except for the interface 930 displayed on the display 160. When the user touch 960 is detected via the arbitrary area except for the interface 930 displayed on the display 160, as shown in FIG. 9D, the electronic device 101 may display the main page according to user configuration through the interface 930. For example, the electronic device 101 may display only the object 925 excluded from the object hiding configuration on the main page through the interface 930.

Figure 10:
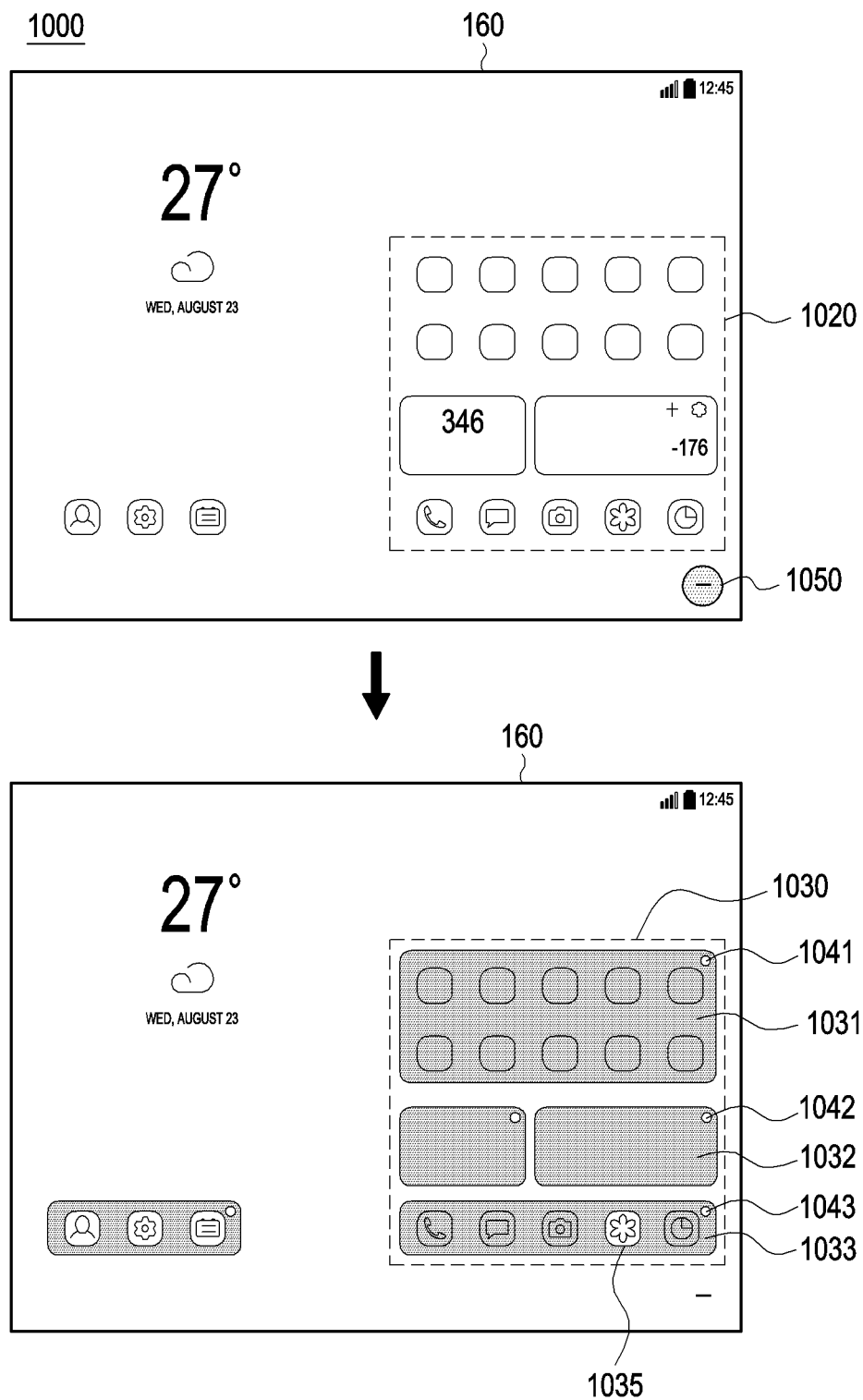
FIG. 10 is an exemplary view illustrating a display method of an electronic device according to various embodiments.
Figure 11:
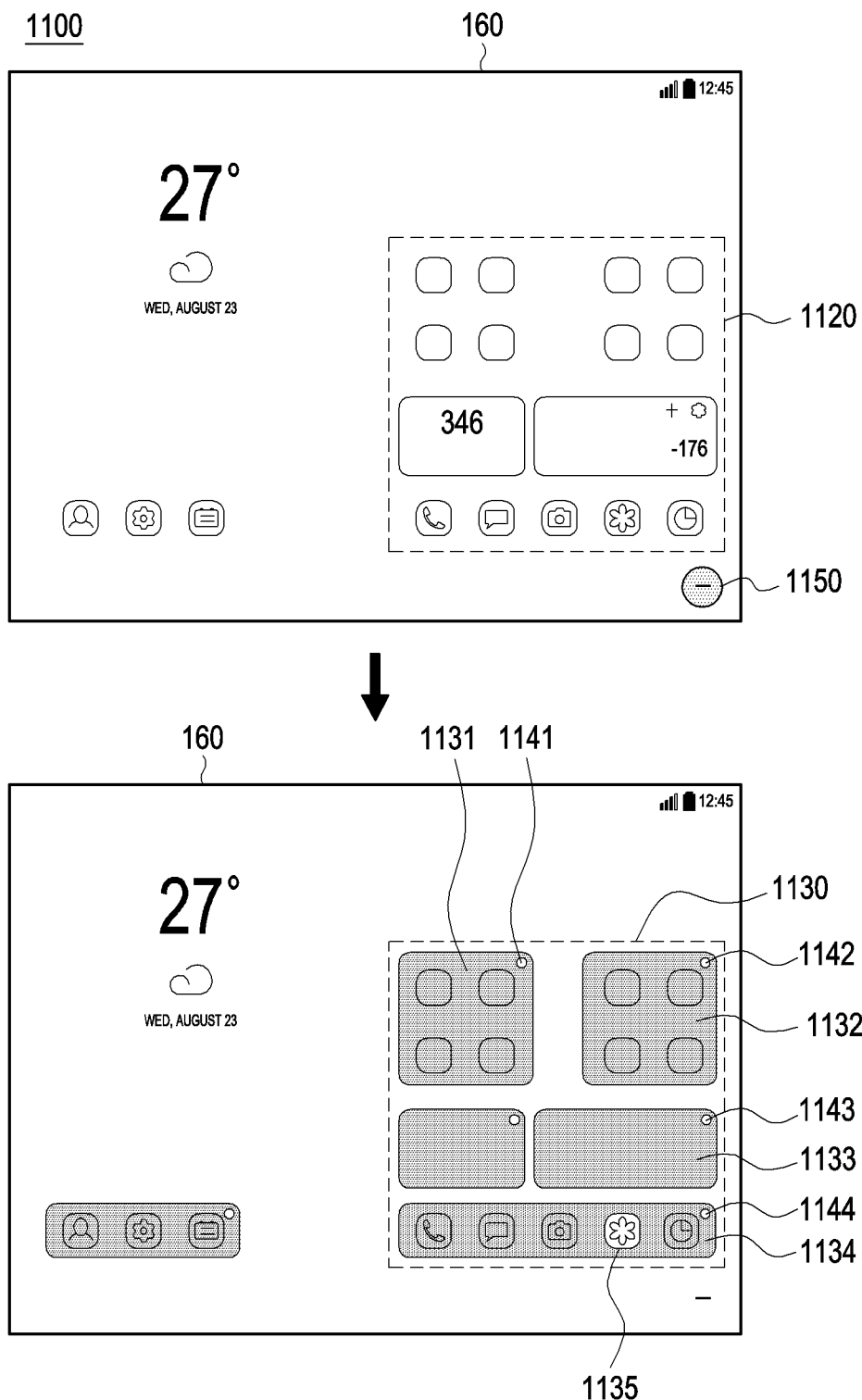
FIG. 11 is an exemplary view illustrating a display method of an electronic device according to various embodiments.

FIG. 10 is an exemplary view 1000 illustrating a display method of an electronic device according to various embodiments. FIG. 11 is an exemplary view 1100 illustrating a display method of an electronic device according to various embodiments.

Referring to FIGS. 10 and 11, the electronic device 101 may display the second object groups 1020 and 1120 on a second portion of a display 160 while the display 160 is spread, and when user's touch gestures 1050 and 1150 are detected on a specific button requesting an interface for configuring object hiding, may provide interfaces 1030 and 1130 capable of receiving a user input for selecting (e.g., applying shading effect) or deselecting (e.g., removing shading effect) an object by a user, in which a shadow effect is applied to objects in the second object group 1020 and 1120 displayed in the second portion of the main page displayed through the display 160.

The electronic device 101 may group adjacent objects in the second object group in the hidden configuration interfaces 1030 and 1130 of the second object group. Grouping of objects may be configured based on a distance between objects. For example, as illustrated in FIG. 10, the electronic device 101 may group adjacent objects in the second object group in the hidden configuration interface 1030 of the second object group to display the same at least one sub-object group 1031, 1032, 1033. Each sub-object group 1031, 1032, and 1033 may be grouped into objects having a distance between objects of x1 or less. In addition, as illustrated in FIG. 11, the electronic device 101 may group adjacent objects in the second object group in the hidden configuration interface 1130 of the second object group to display the same at least one sub-object group 1131, 1132, and 1133. In the case of the double sub-object group 1131, objects having a distance between objects of x1 or more may be grouped into different groups.

The electronic device 101 may display specific buttons 1041, 1042, 1043, 1141, 1142, and 1143 capable of selecting or deselecting all objects in the sub-object group on the upper edge of each grouped sub-object group 1031, 1032, 1033, 1131, 1132, and 1133. When the user touch is detected on the specific button 1041, 1042, 1043, 1141, 1142, 1143, the electronic device 101 may select or deselect all objects in the corresponding sub-object group. Also, the electronic device 101 may receive a user input for individually selecting or deselecting at least one object in the sub-object groups 1031, 1032, 1033, 1131, 1132, and 1133. Also, the electronic device 101 may apply a shadow effect to the specific button 1041, 1042, 1043, 1141, 1142, and 1143 to indicate a selection state (e.g., all selection state, all selection cancellation state, some selection state) of each sub-object group 1031, 1032, and 1033.

Figure 12:
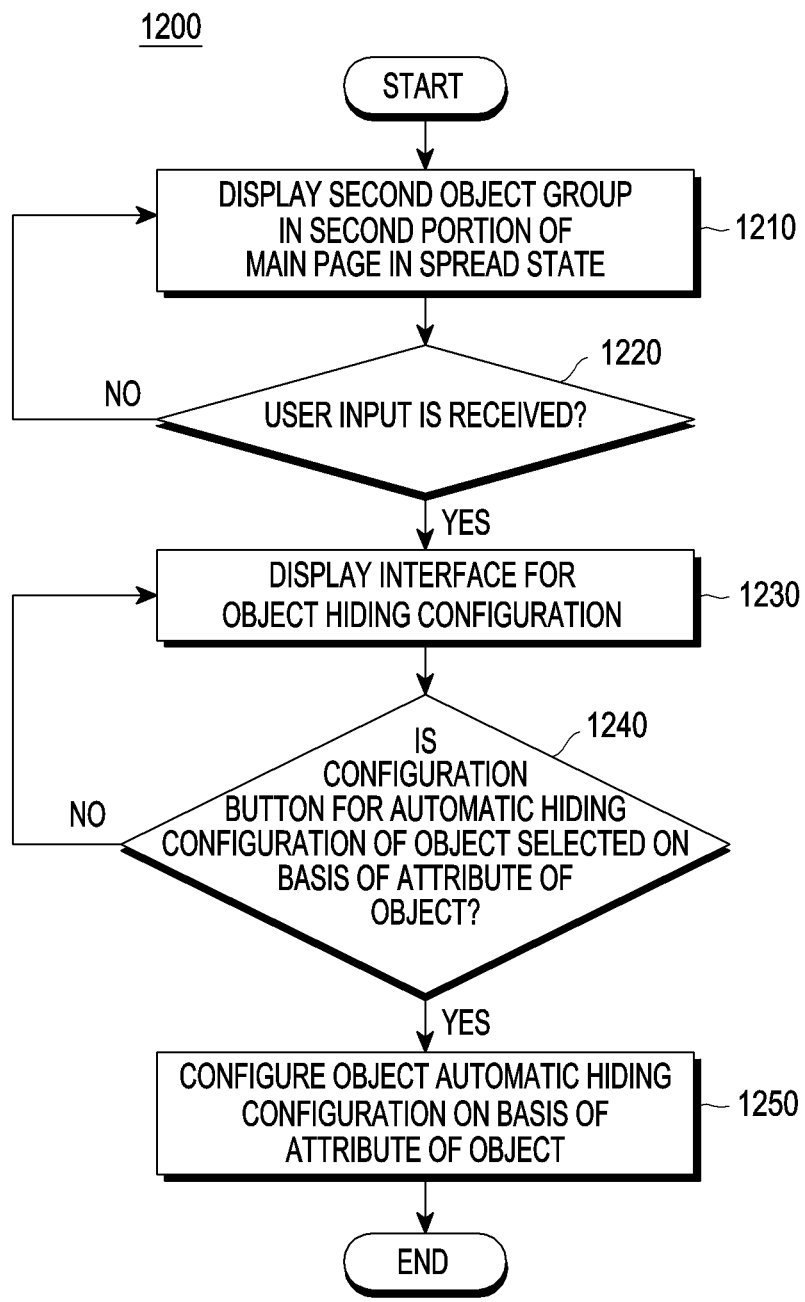
FIG. 12 is a flowchart illustrating a method of controlling a display of an electronic device according to various embodiments.

FIG. 12 is a flowchart 1200 illustrating a method of controlling a display of an electronic device according to various embodiments.

The embodiment of FIG. 12 will be described in more detail with reference to FIGS. 13A to 13C. FIGS. 13A to 13C are exemplary views 1300 illustrating a display method of an electronic device according to various embodiments.

According to various embodiments, operations 1210 to 1250 may be realized through the electronic device 101 or processor 120 of FIG. 1. The electronic device 101 may store instructions for performing the operations 1210 to 1250 in a memory (e.g., the memory 130 of FIG. 1).

In operation 1210, the electronic device 101 may display the second object group on the second portion of the display 160 while the display 160 is spread. For example, if it is not configured to hide at least one object in the second object group to be displayed on the second portion of the spread display 160, the electronic device 101 may display a second object group in which the object is not hidden on the second portion of the display 160. Alternatively, when the hiding of the second object group is released by the user, the electronic device 101 may display a second object group in which the object is not hidden on the second portion of the display 160.

In operation 1220, the electronic device 101 hides or unhides the at least one object in the second object group while the second object group is displayed on the second portion of the display 160, or may determine whether a user input requesting an interface for adding a new object into the second object group is received. For example, the electronic device 101 displays a specific button for configuring the hiding of the second object group on the main page displayed through the display 160, and may receive a user input by detecting a user's touch gesture on the specific button. Alternatively, the electronic device 101 may receive a user input by detecting a specific gesture (e.g., pinch out or long press) of a preconfigured user via an arbitrary area of the display 160. Alternatively, the electronic device 101 may receive a user input by detecting a user's voice or motion using at least one sensor (e.g., microphone, motion sensor, etc.) in the electronic device 101.

In operation 1230, when the user input is received, the electronic device 101 may hide or unhide the at least one object in the second object group in response to the user input, or provide an interface for adding a new object into the second object group. For example, as illustrated in FIG. 13A, the electronic device 101 may provide the interface 1330 capable of receiving a user input for selecting (e.g., applying shading effect) or deselecting (e.g., removing shading effect) an object by a user, in which a shadow effect is applied to objects in the second object group displayed in the second portion of the main page displayed through the display 160. Also, the electronic device 101 may provide an automatic configuring button 1350 for configuring to hide or unhide the at least one object in the second object group at the top of the interface 1330 according to the attribute of at least one object in the second object group.

In operation 1240, the electronic device 101 may determine whether the user selects the automatic configuring button 1350 for automatic hiding configuration of the object based on the attribute of the object. For example, as illustrated in FIG. 13B, if the user does not select the automatic configuring button 1350, the electronic device 101 may indicate that automatic configuring button 1351 is off by displaying the automatic configuring button 1351 to which the shading effect is applied. Alternatively, as illustrated in FIG. 13C, when the user selects the automatic configuring button 1350, the electronic device 101 may indicate that automatic configuring button 1350 is on by displaying the automatic configuring button 1350 to which the shading effect is not applied.

In operation 1250, when the automatic configuring button 1350 is selected by the user, the electronic device 101 may be configured to hide or unhide the at least one object in the second object group according to the attribute of the at least one object in the second object group. The attribute of the object may include at least one of the total number of uses for applications corresponding to each object included in the second object group, recent frequency of use for the applications, or the state of the display 160 when each of the applications is executed (e.g., a folding state or a spread state).

Figure 14:
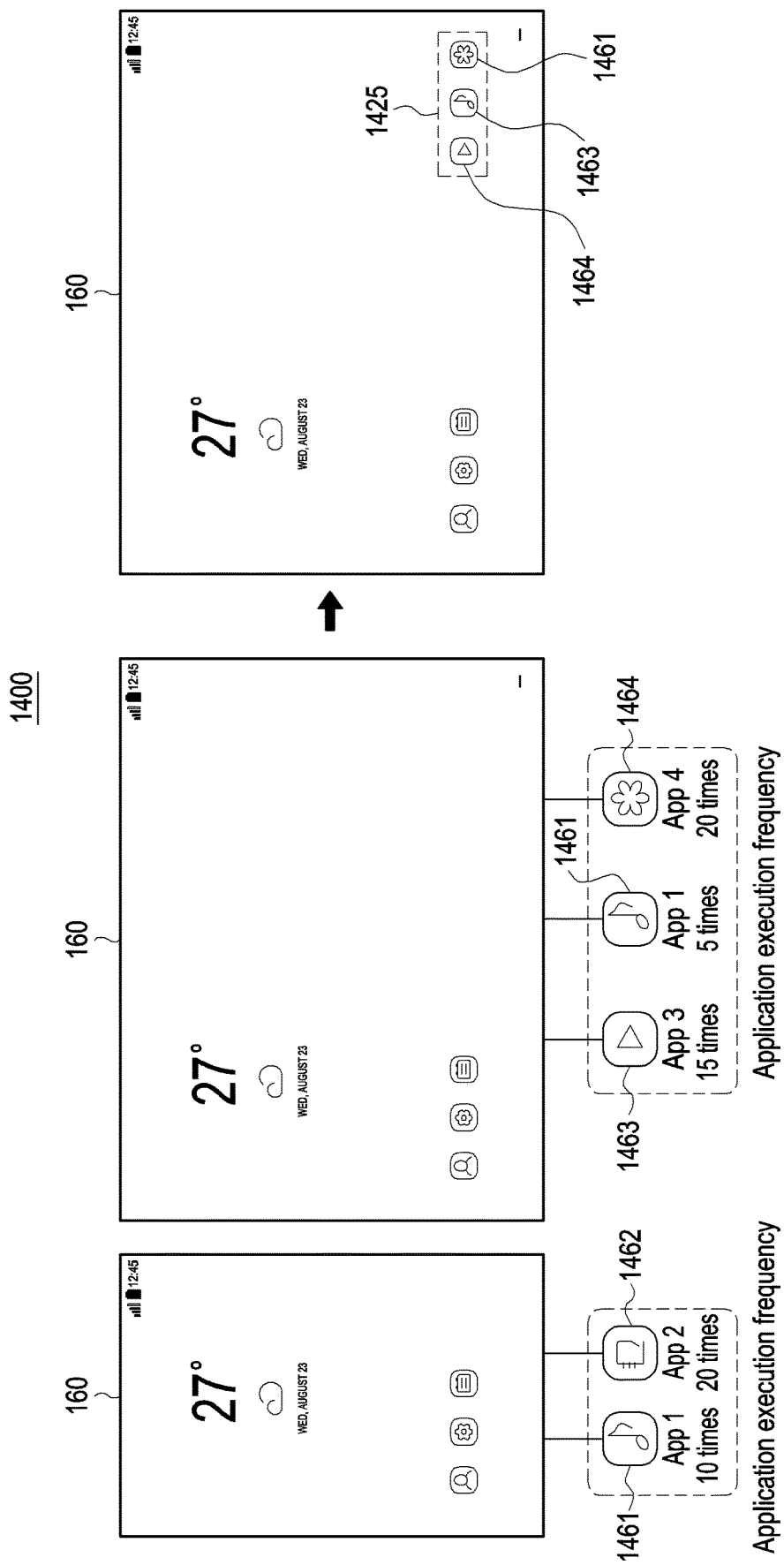
FIG. 14 is an exemplary view illustrating a display method of an electronic device according to various embodiments.

FIG. 14 is an exemplary view 1400 illustrating a display method of an electronic device according to various embodiments.

Referring to FIG. 14, while the second object group is displayed on the second portion of the main page displayed on the display 160, the electronic device 101 according to various embodiments may be configured to hide or unhide the at least one object in the second object group according to the attribute of the at least one object in the second object group. The electronic device 101 may determine the total number of use and recent frequency of use for applications corresponding to each object included in the second object group. In addition, the electronic device 101 may determine the total number of usage and recent frequency of use for applications corresponding to each object included in the second object group for each state of the display 160 (e.g., a folding state or a spread state). For example, the electronic device 101 may determine the execution frequency of the application in the folded state and the spread state of the display 160, and display the object of the application in the order of high execution frequency of the application on the display 160 of the spread state. Also, the electronic device 101 may display the object of the application by adding a weight on the execution frequency of the application executed in the spread state rather than the execution frequency of the application executed in the folded state. For example, as illustrated in FIG. 14, in the folded state, the execution frequency of the first application 1461 is 10 times, the execution frequency of the second application 1462 is 20 times, and in the spread state, the execution frequency of the third application 1463 is 15 times, the execution frequency of the first application 1461 is 5 times, and the execution frequency of the fourth application 1464 is 20 times, the objects 1464, 1463, and 1461 of the application may be selectively displayed in the order of high use frequency, based on the execution frequency of the application in the spread state.

Figure 15:
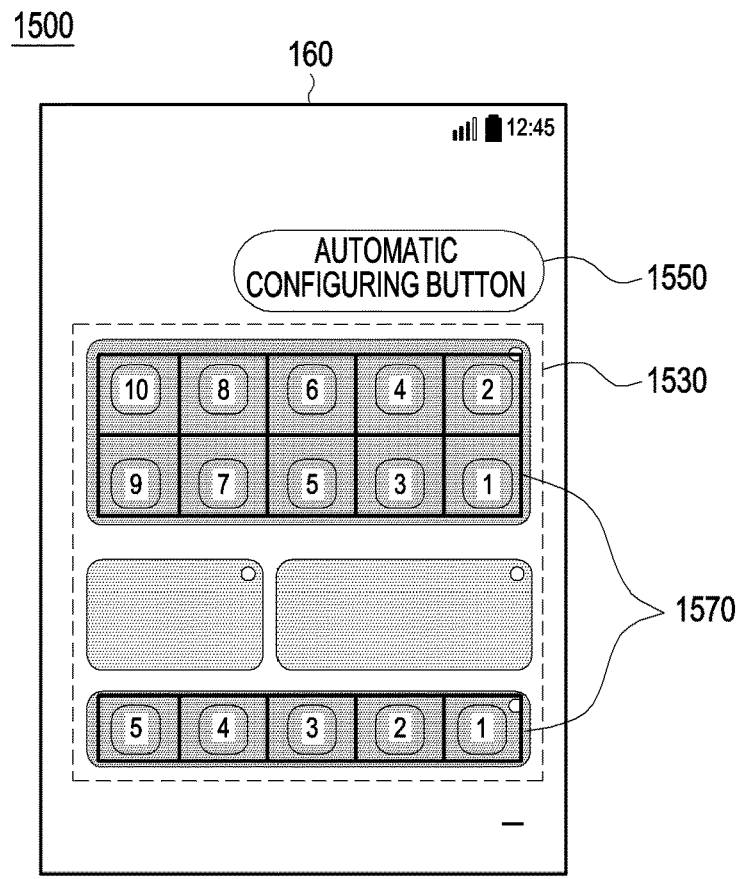
FIGS. 15A and 15B are exemplary views illustrating a method of arranging objects displayed on a display of an electronic device according to various embodiments.

FIGS. 15A and 15B are exemplary views 1500 illustrating a method of arranging objects displayed on a display of an electronic device according to various embodiments.

Referring to FIGS. 15A and 15B, when the at least one unhidden object exists in the second object group in which the object is hidden in the second portion of the main page displayed on the display 160, the electronic device 101 according to various embodiments may rearrange and display the display positions of the objects that are not hidden within the group region to which the at least one object from which the hiding is released belongs. For example, as shown in FIG. 15A, when each object in the second object group 1530 is arranged (1570), as shown in FIG. 15B, each object 1×5, 2×5, 2×5 may be automatically arranged and displayed as a given space.

Figure 16:
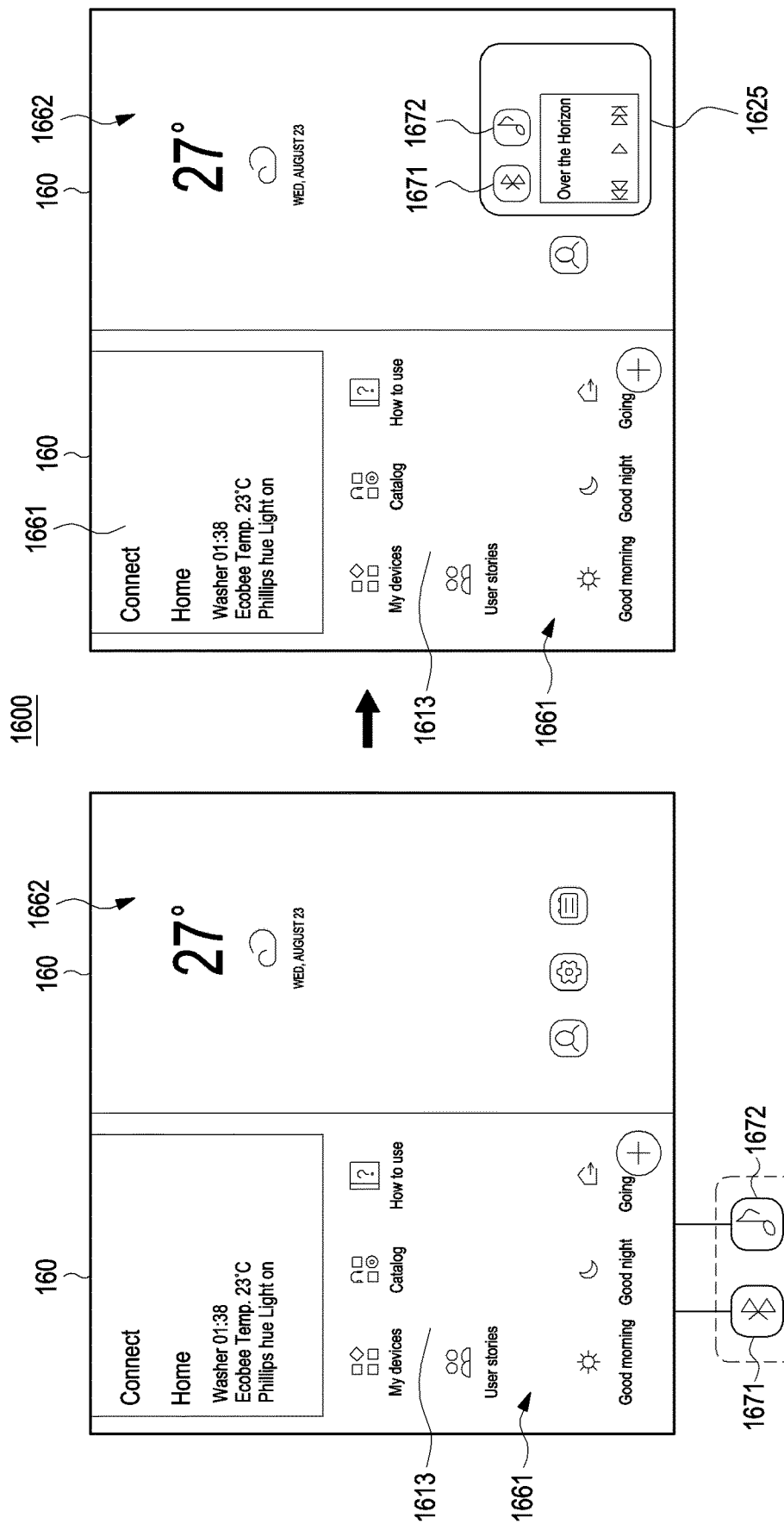
FIG. 16 is an exemplary view illustrating a display method of an electronic device according to various embodiments.

FIG. 16 is an exemplary view 1600 illustrating a display method of an electronic device according to various embodiments.

Referring to FIG. 16, in the spread state, when the execution screen 1613 of the application is displayed on the first portion 1661 of the display 160 in the spread state, and a portion of the main page is displayed on the second portion 1662 of the display 160, the electronic device 101 according to various embodiments may determine the total number of use and recent frequency of use for the application associated with the application displayed in the first portion 1661. For example, the application displayed on the first portion 1661 of the display 160 is associated with the application corresponding to the execution screen 1613, and the execution frequency of the first application 1671 is 15 times and the execution frequency of the second application 1672 is 10 times, the electronic device 101 may selectively display the objects of the first application 1671 and the second application 1672 on the second portion 1662 of the display 160. The display of the object may be displayed in the form of a pop-up window.

According to various embodiments, a method for controlling a display may include: an operation (e.g., operation 610 of FIG. 6) of displaying a first portion of a main page including a first object group while a flexible display (e.g., the display device 160 of FIG. 1 or the flexible display 160 of FIGS. 2 to 3) is folded; an operation (e.g., operation 630 of FIG. 6) of displaying a second portion of the main page including a second object group in which at least one object is hidden, along with the first portion of the main page when the flexible display 160 is spread (e.g., operation 620 of FIG. 6); and an operation (e.g., operation 650 of FIG. 6) of displaying the second object group in a second portion of the main page in response to a user input (e.g., operation 640 of FIG. 6) to release the hiding of the second object group in which the at least one object is hidden.

According to various embodiments, the method for controlling a display may further include an operation of hiding or unhiding the at least one object in the second object group while the second object group is displayed on the second portion of the main page, or an operation (e.g., operation 830 of FIG. 8) of providing an interface for adding a new object in the second object group.

According to various embodiments, the method for controlling a display may further include an operation (e.g., operation 1230 of FIG. 12) of providing a configuration button for configuring to hide or unhide the at least one object in the second object group according to the attribute of the at least one object in the second object group, while the second object group is displayed on the second portion of the main page.

According to various embodiments, the method for controlling a display may further include an operation of rearranging and displaying the display positions of the at least one unhidden object, if there is at least one unhidden object in the second object group in which the at least one object included in the second portion of the main page is hidden.

According to various embodiments, the method for controlling a display may further include an operation of displaying a third object group on a second portion of the main page, if the execution screen of the first application is displayed on the first portion of the main page while the flexible display is spread, the third object group including at least one object associated with the first application and corresponding to at least one second application different from the first application.

According to various embodiments, in a non-transitory storage medium storing instructions, the instructions configured to cause at least one circuit to perform at least one operation when executed by the at least one circuit, wherein the at least one operation may include: an operation (e.g., operation 610 of FIG. 6) of displaying a first portion of a main page including a first object group in a state where the flexible display (e.g., the display device 160 of FIG. 1 or the flexible display 160 of FIGS. 2 and 3) is folded; an operation (e.g., operation 630 of FIG. 6) of displaying a second portion of the main page including a second object group in which at least one object is hidden, along with the first portion of the main page, when the flexible display 160 is spread (e.g., operation 620 of FIG. 6); and an operation (e.g., operation 650 of FIG. 6) of displaying the second object group in the second portion of the main page in response to a user input (e.g., operation 640 of FIG. 6) for releasing the hiding of the second object group in which the at least one object is hidden.

What is claimed is:

1. An electronic device comprising:
a flexible display;
a processor electrically connected to the flexible display; and
a memory electrically connected to the processor,
wherein the memory stores instructions configured to, when executed, cause the processor to:
control the flexible display to display, in an editing interface, a main page divided into a first portion including a first object group and a second portion including a second object group in an unfolded state of the flexible display, the second object group including at least a first object and a second object;
while in the editing interface, in response to a selection of the second object, set at least the second object to be unhidden in the second object group;
control the flexible display to display the first portion in absence of the second portion, in a folded state of the flexible display;
based on the flexible display being spread from the folded state to the unfolded state, control the flexible display to display the second portion including the second object and hide the at least the first object, while maintaining display of the first portion; and
in response to a first user input for unhiding, unhide and display the at least the first object of the second object group in the second portion of the main page,
wherein display the editing interface further includes applying shading to all objects of the second object group set to be hidden, and
wherein when the second object is selected in the editing interface, the applied shading is removed from the second object to indicate the second object is to be automatically unhidden when the flexible display is disposed in the unfolded state and the second portion is displayed.

2. The electronic device of claim 1, wherein each of the first object group and the second object group includes at least one object,
wherein the at least one object of the first object group includes at least one of an icon or a widget, and
wherein each of the at least the first object and the second object of the second object group includes at least one of an icon or a widget.

3. The electronic device of claim 1, wherein the main page comprises:
a first layer in which a background is disposed;
a second layer in which the first object group of the first portion is disposed on the first layer; and
a third layer in which the second object group of the second portion is disposed on the first layer.

4. The electronic device of claim 1, wherein in the main page, the first portion and the second portion are configured as one page, based on a surface on which the flexible display is spread.

5. The electronic device of claim 1, wherein the instructions are configured to cause the processor to:
provide an interface for adding a new object in the second object group.

6. The electronic device of claim 5, wherein the instructions are configured to cause the processor to:
receive a second user input for selecting or deselecting at least one object in the second object group included in the second portion of the main page using the interface; and
hide or unhide the selected or deselected object in the second object group, based on the second user input.

7. The electronic device of claim 6, wherein the instructions are configured to cause the processor to:
group adjacent objects in the second object group included in the second portion of the main page into at least one sub-object group;
receive a third user input for selecting or deselecting at least one sub-object group using the interface; and
hide or unhide the selected or deselected sub-object group in the second object group, based on the third user input.

8. The electronic device of claim 7, wherein the instructions are configured to cause the processor to:
receive a fourth user input for individually selecting or deselecting at least one object in the at least one sub-object group using the interface; and
hide or unhide the selected or deselected object in the second object group, based on the fourth user input.

9. The electronic device of claim 1, wherein the instructions are configured to cause the processor to provide a configuration button for configuring to hide or unhide at least one object in the second object group according to an attribute of the at least one object in the second object group, while the second object group is displayed on the second portion of the main page.

10. The electronic device of claim 9, wherein the instructions are configured to cause the processor to:
receive a second user input for selecting or deselecting the configuration button; and
hide or unhide at least one object in the second object group according to the attribute of the at least one object in the second object group, based on the second user input.

11. The electronic device of claim 10, wherein the attribute of the at least one object comprise at least one of a total number of uses for an application corresponding to the at least one object included in the second object group, recent frequency of use for the application corresponding to the at least one object, or the state of the flexible display when the application is executed.

12. The electronic device of claim 1, wherein the instructions are configured to cause the processor to rearrange and display positions of at least one unhidden object, if there is the at least one unhidden object in the second object group in which the at least one object included in the second portion of the main page is hidden.

13. The electronic device of claim 12, wherein the instructions are configured to cause the processor to rearrange and display the display positions of the at least one unhidden object within a group region to which the at least one unhidden object belongs, if there is the at least one unhidden object in the second object group in which the at least one object included in the second portion of the main page is hidden.

14. The electronic device of claim 1, wherein the instructions are configured to cause the processor to display a third object group on a second portion of the main page if an execution screen of a first application is displayed on the first portion of the main page while the flexible display is spread, the third object group including at least one object associated with the first application and corresponding to at least one second application different from the first application.

15. The electronic device of claim 1, wherein the first user input includes a gesture received on any area of the flexible display in absence of reference to any displayed object after the flexible display is fully disposed flat in the unfolded state.

16. The electronic device of claim 15, wherein the at least the first object of the second object group remains hidden after the flexible display is fully disposed flat in the unfolded state, and
wherein the first user input to unhide the at least the first object is received after the flexible display is fully disposed flat.

17. A non-transitory storage medium storing instructions, the instructions configured to cause at least one circuit to perform at least one operation when executed by the at least one circuit, wherein the at least one operation comprises:
controlling a flexible display to display, in an editing interface, a main page divided into a first portion including a first object group and a second portion including a second object group in an unfolded state of the flexible display, the second object group including at least a first object and a second object;
while in the editing interface, in response to a selection of the second object, setting the second object included in the second object group to be unhidden in the second object group;
controlling the flexible display to display the first portion in absence of the second portion, when the flexible display is in a folded state;
based on the flexible display being spread from the folded state to the unfolded state, controlling the flexible display to display the second portion including the second object and hide the at least the first object, while maintaining display of the first portion; and
in response to a first user input for releasing the hiding, unhiding and displaying the at least the first object of the second object group in the second portion of the main page,
wherein display the editing interface further includes applying shading to all objects of the second object group set to be hidden, and
wherein when the second object is selected in the editing interface, the applied shading is removed from the second object to indicate the second object is to be automatically unhidden when the flexible display is disposed in the unfolded state and the second portion is displayed.

18. A method in an electronic device, comprising:
displaying, on a flexible display of the electronic device, in an editing interface, a main page divided into a first portion including a first object group and a second portion including a second object group in an unfolded state of the flexible display, the second object group including at least a first object and a second object;
while in the editing interface, in response to a selection of the second object, setting the second object to be unhidden in the second object group;
displaying, on the flexible display, the first portion in absence of the second portion in a folded state of the flexible display;
spreading the flexible display from the folded state to the unfolded state;
based on the flexible display being spread from the folded state to the unfolded state, displaying, on the flexible display the second portion including the second object and hide the at least the first object, while maintaining display of the first portion; and
receiving a first user input, and in response to the first user input for unhiding, unhide and display the at least the first object of the second object group in the second portion of the main page,
wherein display the editing interface further includes applying shading to all objects of the second object group set to be hidden, and
wherein when the second object is selected in the editing interface, the applied shading is removed from the second object to indicate the second object is to be automatically unhidden when the flexible display is disposed in the unfolded state and the second portion is displayed.

* * * * *